Patented Nov. 13, 1945

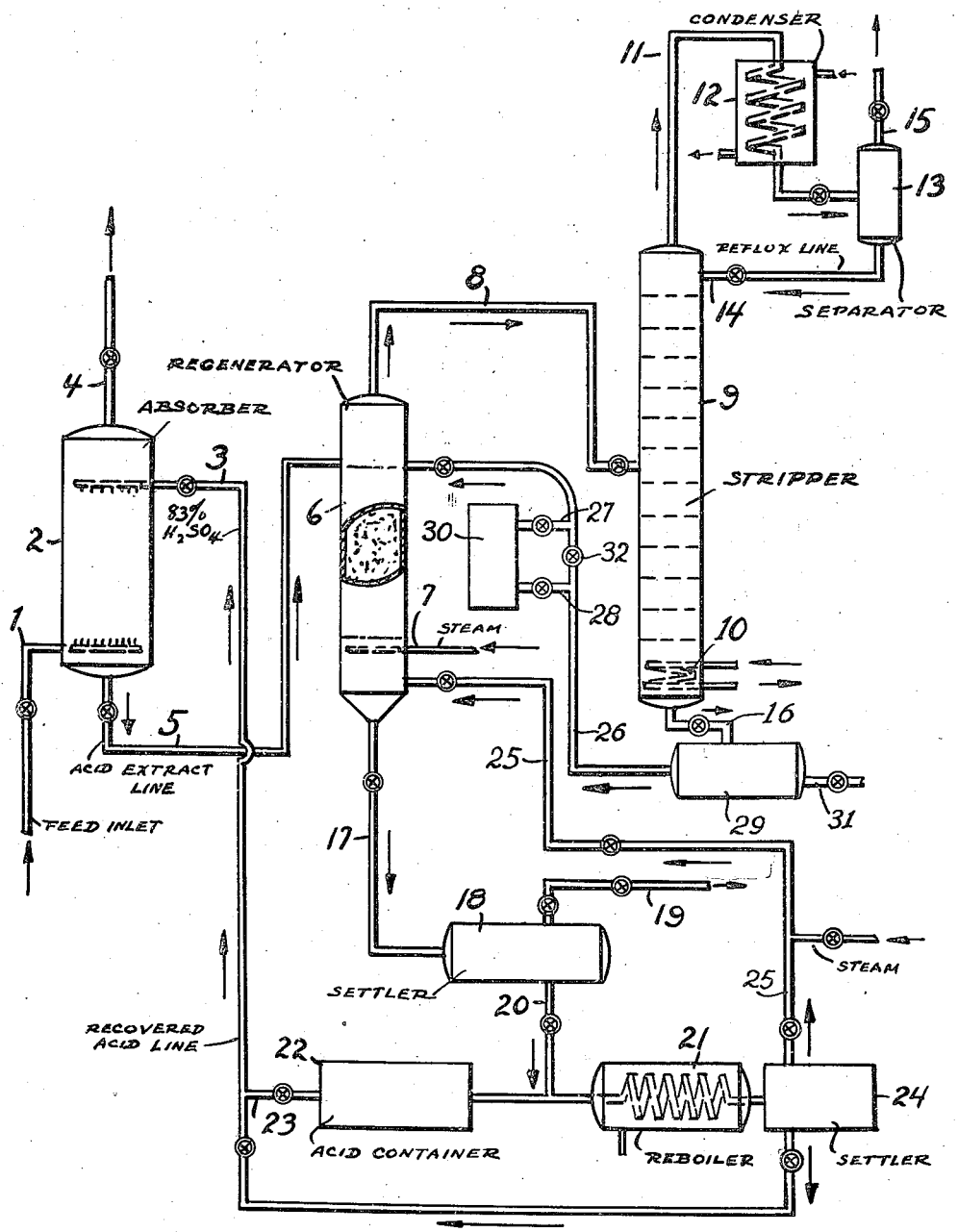

2,388,971

UNITED STATES PATENT OFFICE 2,388,971

RECOVERY AND REGENERATION OF NORMAL BUTENES FROM A SULPHURIC ACID SOLUTION THEREOF

Henry J. Hibshman, Plainfield, and William T. Knox, Jr., Elizabeth, N. J., assignors to Standard Oil Development Company, a corporation of Delaware Application January 1, 1942, Serial No. 425,376

5 Claims. (Cl. 260—677)

The present invention relates to improvements in the process for the separation and recovery of normal butenes from mixtures of olefins and saturated hydrocarbons which are associated in gaseous and light liquid hydrocarbon mixtures and more particularly to the method of recovery of normal butenes from sulphuric acid solutions.

There are many chemical processes in which it is a decided advantage to use a substantially pure olefin, unmixed with diluents, such as saturated hydrocarbons. For example, in chemical reactions with the gaseous olefins in which pressure is advantageous, the effective pressure is normally the partial pressure of the reactive olefin in the mixture. In such cases, substantially pure olefins permit much lower pressures to be employed and less gas to be compressed than in the case of gas mixtures poor in reactive olefin. Also, in many cases the olefin reaction may be reversible, the proportion of the desired product being dependent upon the concentration of reactive olefin in the mixture. In such cases, the dilution of the olefin with a diluent, such as a saturated hydrocarbon, may so affect the yield of the desired reaction product as to render the process unprofitable. Also, the desired reaction product may be very volatile or the chemical reagent used to react with the olefin may be very volatile and carried away by the relatively unreactive diluent.

It is known in the art that olefins may be dissolved from a hydrocarbon mixture by contacting with sulphuric acid solutions and that these olefins may be recovered by diluting and heating the acid solution. In the processing of a C$_4$ cut it is established practice to remove the isobutene first by contacting the hydrocarbon mixture with a sulphuric acid solution of approximately 65% concentration and at a temperature of approximately 65° F. The hydrocarbons remaining, consisting of normal butane, isobutane and butenes, are then contacted with sulphuric acid of approximately 83% concentration and at a temperature of approximately 85° F. to dissolve the normal butenes present. The acid extract is diluted with steam and heated to remove overhead a gaseous mixture of normal butenes, polymer, butyl alcohol, ether, and water. This vapor mixture is fractionated for the recovery of butenes. A satisfactory utilization of the liquid residue from this fractionation, which consists largely of polymer and alcohol, has not been developed and it constitutes a considerable loss of butenes. By existing procedure, approximately 65% of the normal butenes initially present in the C$_4$ cut are recovered whereas approximately 35% are converted to other less desirable liquid products. Even when these liquid products were redistilled by complicated procedure involving ternary azeotropes, less than 80% of butenes can be recovered.

It is an object of this invention to substantially increase the amounts of normal butenes that are recovered when sulphuric acid is used as the absorbent for the separation of normal butenes from the saturated hydrocarbons.

Another object of this invention is to recover at least 95% of the normal butenes in pure form and substantially reduce the amount of undesirable products that are produced. This and other objects of the invention will be more clearly understood with reference to the drawing.

A C$_4$ cut containing both saturated and unsaturated hydrocarbons is first treated with sulphuric acid of 65% concentration at a temperature approximately 65° F. to remove isobutene that is present. The separated hydrocarbon fraction consisting of normal butane, isobutane and normal butenes is passed through inlet 1 into contacting zone 2 in countercurrent flow to sulphuric acid of 83% concentration which is introduced by means of pipe 3 into the upper part of contacting zone 2. The spent gas is removed from the upper part of the zone 2 by means of pipe 4 and consists of normal butane and isobutane. An acid extract is removed from the bottom of zone 2 by means of pipe 5 and consists of the sulphuric acid containing 15 to 30% by weight of butenes in solution. The acid extract is introduced into the upper part of regenerator 6 and flows in countercurrent flow to steam introduced through inlet 7 into the lower part of regenerator 6. The distillate consisting of butenes, alcohol, polymer and traces of other compounds such as ethers, is removed through outlet 8 from the upper part of regenerator 6 and introduced into fractionator or stripper 9 to which heat is supplied by means of steam coil 10 and butenes are distilled over through pipe 11 passing through condenser 12 to separator 13 from which a reflux is returned to the upper part of the fractionator by means of pipe 14. Butenes of 95% purity are removed from the upper part of separator 13 by means of line 15.

An alcohol-polymer-water mixture is removed from the bottom of fractionator 9 by means of pipe 16 and flows into a tank 29. If desired, the mixture may be allowed to stratify in this tank and the polymer layer may be drawn off through line 26 and passed directly into regenerator 6. Alternatively, the polymer layer may be passed through valved pipe 28 into vaporizer 30 from which a vaporized polymer passes through valved pipe 27 into pipe 26, pipe 26 being arranged with valve 32 to regulate path of flow, and thence into regenerator 6. The alcohol and water may be drawn off from tank 29 by means of valved pipe 31. The entire contents of tank 29 may be passed directly to the regenerator 6 or through the vaporizer, if it is not desired to segregate the polymer from the alcohol and water. The alcohol-polymer-water bottoms may consist of two phases, the upper phase containing 5% or less of water, 20–80% of polymer and the rest butyl alcohol; the lower phase, which constitutes less than 15% of the total bottoms volume, containing from 10–20% of butyl alcohol and the rest water. The aqueous layer of butyl alcohol may be treated separately for the recovery of the butyl alcohol if it is desired to obtain any butyl alcohol. From the bottom of the regenerator 6 a spent acid is removed by means of pipe 17 and passed to a settler 18 where the polymer is separated and may be removed through pipe 19. The percentage of polymer recovered here varies between 2–4%. The spent acid is removed from the settler 18 by means of pipe 20 and may be passed through a reboiler 21, reconcentrated and returned to the absorber 2 by pipe 3 or may be passed to an acid container 22 and refortified and returned to the absorption tower 2 by means of pipes 23 and 3. The steam formed in reboiler 21 after being freed of acid in settler 24 may be returned to the bottom part of the regenerator 6 by pipe 25.

By recycling the stripper bottoms, approximately 30% more butene is recovered and the percentage of undesirable by-products is reduced to a minimum. Also, the spent acid and polymer may be removed from the regenerator 6 and contacted with fresh C4 feed to remove the polymer, this product being removed with the normal butane and isobutane.

The regenerator 6 may consist of any suitable tower such as a bubble cap tower or a packed tower which provides adequate contacting of the acid solution and the steam. This tower is operated with a very low liquid interface.

In a typical run the regenerator was operated with a tower top temperature of 83° C. and tower bottom temperature of 123° C. The tower temperature may range from 75° C. to 140° C. The quantity of steam employed in this run (2.2 pounds per gallon of extract) served to dilute the acid from 83% $H_2SO_4$ concentration in the feed to 62.5% $H_2SO_4$ in the spent acid.

In order to accomplish an effective separation in the butene stripper some refluxing of butenes must be employed and the heat required in this operation may be supplied by preheating the mixture of butenes, polymer, etc., or by reboiling the bottoms from this stripper, or both. In a typical operation, the bottoms product obtained from the butene stripper and recycled to the regenerator amounted to 27% of the extract feed to the regenerator.

The recycle stream may also be introduced into regenerator 6 at an intermediate point or points. Thus a part of the stream or the whole stream may be introduced at the bottom of the regenerator. Steam and/or inert stripping agents may be introduced at one or more places in the regenerator. The recycled stream to the regenerator may be heated to vaporize it before it is introduced into the regenerator 6. By revaporizing the recycle stream and by introducing it into the regenerator at an intermediate point or points, small temperature fluctuations in the regenerator are avoided and the steam input in the regenerator need not be varied.

We claim:

1. Method of recovery and regeneration of normal butenes, which comprises contacting a mixture of hydrocarbons containing normal butenes with sulphuric acid of about 83% concentration, contacting, in a steam distilling zone, the sulphuric acid solution of normal butenes thereby formed, with steam in quantity sufficient substantially to dilute the acid and having a heating effect sufficient to produce a distillate containing normal butenes, alcohol, polymers and water, fractionating the distillate to separate normal butenes as vapor from alcohol, polymers and water, and recycling alcohol, polymers and water to the sulphuric acid solution of normal butenes.

2. Method according to claim 1, in which the alcohol, polymers and water are separated into two layers, one an alcohol-polymer layer which is recycled to the sulphuric acid solution of normal butenes, and the other an alcohol-water layer which is separately distilled to recover alcohol.

3. Method according to claim 1, in which superheated steam is used to dilute the sulphuric acid to about 62.5% concentration and to obtain a temperature of about 75° to 140° C. in the steam distilling zone.

4. Method of recovery and regeneration of normal butenes from sulphuric acid solution, which comprises subjecting said solution to elevated temperature by contact with steam under conditions to liberate normal butenes and to produce a substantial amount of polymers and alcohol, recovering a vaporized product containing normal butenes, alcohol and polymers, fractionating the vaporized product to separate normal butenes as vapor from alcohol and polymers, separating the polymers from at least the greater part of the alcohol, and recycling them to the sulphuric acid solution of normal butenes.

5. Method according to claim 4, in which superheated steam is used in quantity sufficient to dilute the sulphuric acid to about 62.5% concentration and to obtain a temperature of about 75° to 140° C. in the steam distilling zone.

HENRY J. HIBSHMAN.
WILLIAM T. KNOX, JR.